United States Patent
Shiley et al.

[15] 3,693,624
[45] Sept. 26, 1972

[54] TRACHEOTOMY TUBE

[72] Inventors: Donald P. Shiley, 11022 Huntinghorn, Santa Ana, Calif. 92705; Bruce E. Fettel, Diamond Bar; Kenneth L. Hardy, Oakland, both of Calif.

[73] Assignee: Donald P. Shiley, Santa Ana, Calif.

[22] Filed: Oct. 2, 1969

[21] Appl. No.: 863,229

[52] U.S. Cl. ................................ 128/351, 128/208
[51] Int. Cl. ........................................ A61b 25/00
[58] Field of Search ................ 128/348–351, 208, 128/145.6

[56] References Cited

UNITED STATES PATENTS

| | | | |
|---|---|---|---|
| 2,786,469 | 3/1957 | Cohen | 128/351 |
| 3,169,529 | 2/1965 | Koenig | 128/351 |
| 3,322,126 | 5/1967 | Rusch et al. | 128/351 |
| 3,402,717 | 9/1968 | Doherty | 128/351 |
| 3,481,339 | 12/1969 | Puig | 128/351 |
| 3,504,676 | 4/1970 | Lomholt | 128/351 |

FOREIGN PATENTS OR APPLICATIONS

| | | | |
|---|---|---|---|
| 198,517 | 8/1967 | U.S.S.R. | 128/351 |

OTHER PUBLICATIONS

Lancet; Jan. 7, 1956, pg. 26.

*Primary Examiner*—Dalton L. Truluck
*Attorney*—Fowler, Knobbe & Martens

[57] ABSTRACT

A tracheotomy tube for insertion into the trachea to support breathing, having a 70° arc between its two ends and including a concave sealing balloon which, when inflated, assumes a cylindrical shape and therefore forms a seal between the cannula and the trachea over an extended axial length, the tracheotomy tube also incorporating an inner cannula which is disposed within and throughout the entire length of the outer cannula and is connected to the outer cannula by a removable fitting which assures a pneumatic seal between the two cannulas, the tracheotomy tube also including a rotatable connector which allows attachment to respiration support equipment in a variety of angular positions. The portion of the tracheotomy tube which extends outside of the patient is hinged to a swivel neck flange which makes the tube adaptable to various anatomies. The tube leading to the sealing balloon is controlled by an isolation valve outside of the patient which allows quick sealing and releasing of the pressure within the sealing balloon.

5 Claims, 9 Drawing Figures

INVENTORS.
DONALD P. SHILEY
BRUCE E. FETTEL
KENNETH L. HARDY
BY FOWLER, KNOBBE
& MARTENS
ATTORNEYS.

INVENTORS.
DONALD P. SHILEY
BRUCE E. FETTEL
KENNETH L. HARDY
BY FOWLER, KNOBBE
& MARTENS
ATTORNEYS.

INVENTORS.
DONALD P. SHILEY
BRUCE E. FETTEL
KENNETH L. HARDY
BY FOWLER, KNOBBE
& MARTENS
ATTORNEYS.

TRACHEOTOMY TUBE

This invention relates to tracheotomy tubes and, in particular, to a tracheotomy tube which is designed to facilitate easy removal of obstructions within the tube and to minimize irritation of the trachea.

Tracheotomy tubes have been used to circumvent tracheal obstructions or to provide direct access to the trachea for forced respiration, either by inserting the tube through the patient's mouth and past the obstruction, or by inserting a similar tube through an incision in the patient's neck into the trachea. Prior tracheotomy tubes have caused a considerable amount of discomfort to the patient and infections in the trachea due to their failure to adjust to a given patient's anatomy and the means used for sealing the cannula of the trachea tube within the trachea. These tubes had an abrupt curvature which fit the trachea poorly, and depended on a toroidal balloon for the cannula to trachea seal, which toroidal balloon required substantial pressure on the inner tracheal wall. As a consequence of this discomfort patients who were forced to use such a device for a prolonged period of time in some cases suffered permanent tracheal damage.

In addition, connection of prior tracheotomy tubes to machines designed to assist respiration has involved the placement of respirator tubing and similar equipment in positions which not only brought discomfort to the patient but required inconvenient placement of the respirator equipment itself. Furthermore, connection of some of the previous tracheotomy tubes to respirator equipment has been accomplished through a connection to the outer cannula. This permits hospital personnel to remove the inner cannula completely and still use artificial respirator equipment. Since the inner cannula is used to remove obstructions from the tracheotomy tube without the complete removal of the tube itself, any such use of the tracheotomy tube without the inner cannula in place may result in a clogged outer cannula requiring removal of the complete tracheotomy assembly for cleaning. Likewise, to adequately clean the outer cannula, it is important that the inner cannula be aligned to run the entire length of the outer cannula, but not extend substantially beyond the outer cannula, since removal and insertion of an extending inner cannula would cause abrasion of the trachea and damage to the delicate cilia along the inner tracheal wall. Prior means of connecting the inner and outer cannulas did not assure such alignment.

In addition prior art devices have not provided a conveniently operable means for sealing the tube to maintain the toroidal balloon fully inflated. Therefore, since the pressure which is applied to the sealing balloon must be held within a restricted range, and since these seals are normally inflated through the use of a hypodermic syringe, it has been very difficult to accurately inflate the seal.

The present invention provides a novel tracheotomy tube which is readily adaptable to a variety of patient anatomies, and which eliminates many of the problems of prior art tracheotomy tubes. It allows connection to respirator devices from a variety of angular positions and permits connection of artificial respirator devices to the tracheotomy tube only when the inner cannula has been inserted. This latter feature of the present tracheotomy tube requires the use of a seal between the inner and outer tracheotomy tubes so that respiration pressure from an artificial respiration machine is not lost by leakage at this point. This enables accurate measurement of patient oxygen intake and administration of precise dosage of medicaments to the patient.

The present tracheotomy tube also includes a novel sealing balloon on the outer cannula which is constructed so that in the inflated condition it presents an extended cylindrical rather than toroidal sealing surface for contacting the inner wall of the trachea. This extended surface allows an adequate seal to be formed between the tracheotomy tube and the trachea without applying excessive pressure, and therefore without risking damage to the trachea.

The cannula of the present tracheotomy tube forms a 70° arc through its length, rather than the 90° arc used in prior art devices. This 70° arc allows the distal end of the cannula, which carries the inflatable seal to be aligned approximately parallel to the tracheal walls and therefore further enhances the likelihood of a low pressure seal over an extended length of trachea.

The tracheotomy tube of this invention provides a means for accurately axially spacing a removable inner cannula within an outer cannula after the outer cannula has been inserted into the trachea without removal of the outer cannula.

While prior art tracheotomy tubes have been firmly attached to a neck flange which was strapped to the neck of the patient, the present device incorporates a hinged neck flange which allows the tracheotomy tube to be properly inserted into the trachea while still supported by a neck flange adaptable to a variety of patient anatomies.

To facilitate inflation of the sealing balloon, a simple snap or pinch valve has been devised for use in place of more complicated valves in prior art devices. This valve allows quick sealing of the pneumatic tube which is connected to the sealing balloon and therefore enhances the accuracy of proper filling of this balloon. The valve is integrally connected to an inflation tubing and can easily be manipulated with one hand.

With this general description of the invention in mind, a thorough understanding of the present tracheotomy tube is best achieved by reference to the drawings in which.

Figure 1:
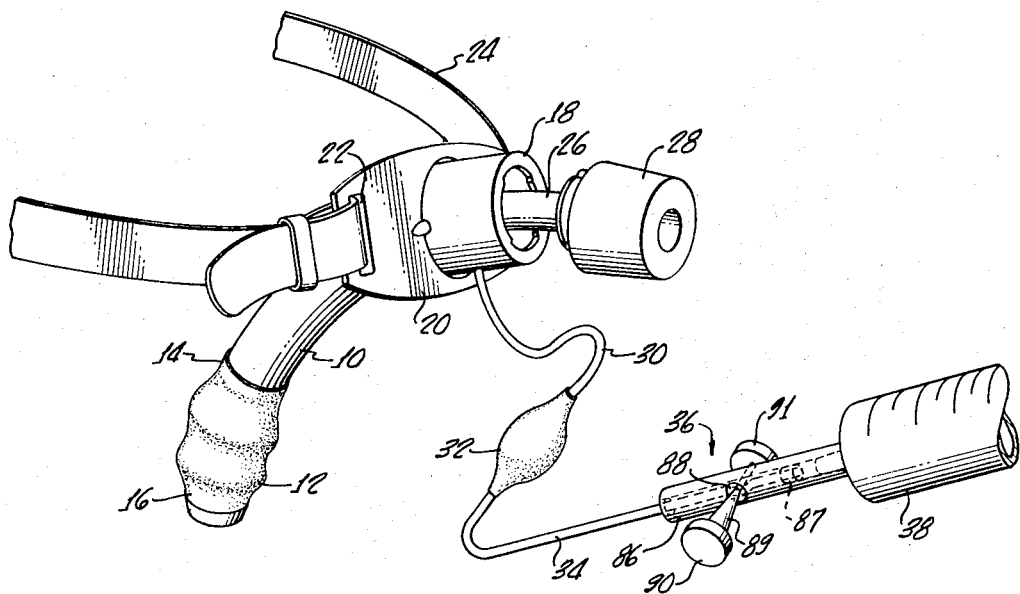
FIG. 1 is a perspective view of the tracheotomy tube assembly with the inner cannula partially removed and with a neck strap attached to the hinged flange.

Referring first to FIG. 1, the basic structural components of the present invention may be described. The outer cannula 10 is in the form of a semi-rigid, thin walled tube which is curved through approximately a 70° arc between its ends. Near one end of this tube is mounted a coaxial, concave, inflatable sealing balloon 12 which is shown in its deflated condition. The ends 14 and 16 of this sealing balloon 12 are attached and sealed to the outer cannula 10. The other end of the outer cannula 10 is firmly attached to a cylindrical connector 18, which in turn rotatably mounts a swivel neck flange 20, which is free to rotate through a limited arc about a horizontal axis. The swivel neck flange 20 has slots 22 at each of its ends for receiving a neck strap 24. The swivel neck flange 20 and the neck strap 24 are used to secure the entire device to the neck of the patient by holding the neck flange 20 flush against the neck proximate the incision through which the outer cannula 10 passes into the trachea.

Into the outer cannula 10 is inserted an inner cannula 26 which, like the outer cannula 10, is a semi-rigid, thin walled, hollow tube which is curved through approximately a 70° arc from one end to the other. This inner cannula 26 is approximately the same length as the outer cannula 10, such that when fully inserted into the outer cannula 10, such that 10 the ends of the inner cannula 10 and the outer cannula 26 will be flush, or the inner cannula will extend beyond the outer cannula by a very small amount not exceeding about one thirty-second of an inch.

Rotatably mounted on one end of the inner cannula 26 is an axially tapered, cylindrical connector 28, constructed to matingly engage with the cylindrical connector 18 and, when fully engaged, to form a pneumatic seal between the inner cannula 10 and the outer cannula 26. The outer end of the connector 28 is usually tapered to form a frusto-conical configuration bored fitting for connection with respiration support equipment.

The sealing balloon 12 is pressurized through an axially extending passageway 40 in the wall of the outer cannula (see FIG. 2) through which a flexible inflation tube 30 extends. This tube is in turn connected through an inflatable indicator bulb 32 to another flexible inflation tube 34 which passes through a tube constricting pinch valve 36. The sealing balloon 12 may be pressurized by inserting a hypodermic syringe 38 into the end of the tube 34 or into an enlarged opening in the valve 36, as will be discussed, with the valve 36 in its open condition. By forcing air into the tube 34 with the hypodermic syringe 38, both the sealing balloon 12 and the indicator bulb 32 may be inflated. The valve 36 may now be closed and the hypodermic syringe 38 removed, leaving the sealing balloon 12 and the indicator bulb 32 inflated. Any leak in the pressurized system which causes the sealing balloon 12 to deflate will, in turn, cause the indicator bulb 32 to deflate, providing a visible indication outside of the patient of this problem.

The tube 34 may have one end bonded to the valve 36, or may pass through the valve 36 for insertion of the inflation device into the tube.

Figure 2:
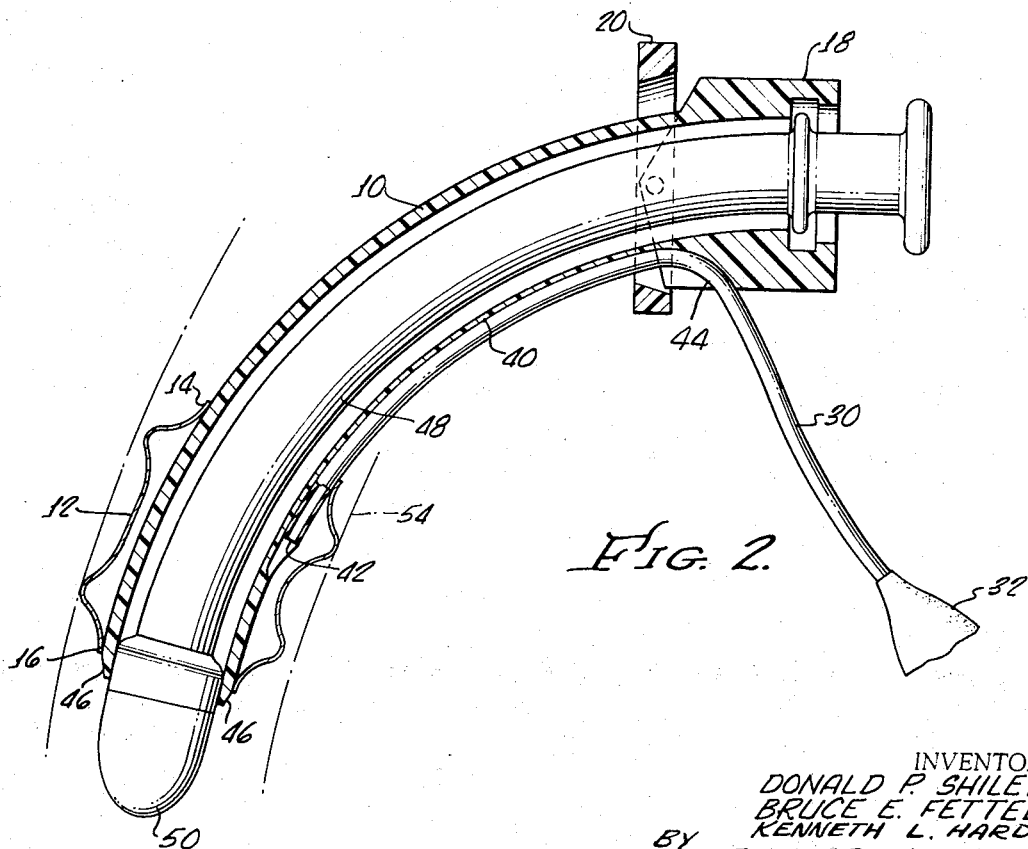
FIG. 2 is a vertical section of the outer cannula of the tracheotomy tube with the obturator fully inserted.

Referring now to FIG. 2, the details of the outer cannula 10 and the sealing balloon 12 may be explained. The outer cannula 10 in addition to its large central bore, as discussed, has a small diameter, axially extending tubular passageway 40 in one wall through which the tube 30 extends. This tubular passageway 40 opens at one end 42 into the cavity within the sealing balloon 12. The other end of the tubular passageway 40 may open onto an axially offset cylindrical bore 44 within the connector 18. This cylindrical bore 44 receives the tube 30 for permanent attachment to the connector 18. The tubular passageway 40 therefore allows pneumatic pressure variations to be transmitted through the tube 30 into the chamber enclosed by the sealing balloon 12 for inflation of the balloon and sensing of balloon deflation.

The distal end 46 of the outer cannula 10 is chamfered to allow a fairly smooth surface continuation of the outer cannula 10 to a stylette or obturator 48. The obturator 48 is also curved through approximately a 70° angle and is constructed of rigid polymer material. The obturator 48 is inserted within the outer cannula through the bore of the connector 18 in order to present a blunt, rounded end 50 to facilitate insertion of the outer cannula 10 into the trachea. During such insertion, the sealing balloon 12, which is deflated, is free to collapse almost completely against the outer wall of the outer cannula 10. Therefore, the projection of the outer cannula 10 and the sealing balloon 12, the chamfered end 46 of the outer cannula 10, and the obturator 48, as a unit, into the trachea may be accomplished without gouging or cutting the tracheal tissue with any sharp edges. Once the assembly has been inserted into the trachea, the obturator 48 may be withdrawn from the outer cannula 10, providing a passageway through the hollow bore of the outer cannula 10 from the inside of the trachea to the connector 18.

The sealing balloon 12 is a flexible polymer impermeable membrane which, in its deflated or relaxed condition shown in FIG. 2, assumes the shape of a cylinder with concave walls. The ends 14 and 16 of this cylinder extend outwardly from and are attached to the outer wall of the outer cannula 10. Due to the concave walls, the sealing balloon 12 assumes the shape of a straight-walled cylinder when properly inflated (see FIG. 3). Previous tracheotomy tubes had sealing balloons which assumed a toroidal shape when inflated, and therefore relied upon a relatively high pressure at the point of contact of the toroid with the trachea to form an adequate seal. By utilizing a cylindrical shape, a low pressure seal may be achieved with the trachea, since the seal extends over an extended axial length of the trachea. Such a distribution of pressure axially along the inner wall of the trachea reduces necrosis of the inner tracheal tissue which might lead to tracheal stenosis.

Figure 3:
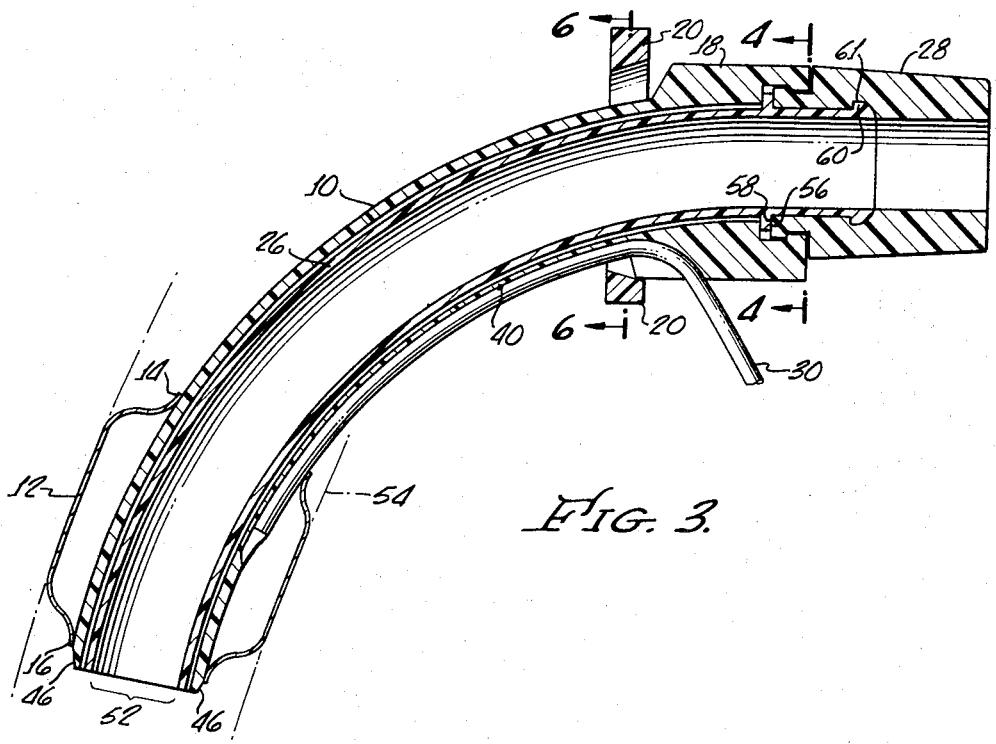
FIG. 3 is a vertical section through the outer cannula with the inner cannula fully inserted and the sealing balloon properly inflated.

Referring now to FIG. 3, the use and placement of the inner cannula 26 may be described. After the outer cannula is in place and the obturator 48 has been removed, the inner cannula 26 is gently inserted axially into the bore of the outer cannula 10. Since the inner and outer cannula 10 and 26 are curved at only 70°, this insertion is appreciably easier than with the previous 90° angles, since in both cases the tubes are semi-rigid and may occasionally have some tendency to bind if the person putting the inner cannula in place is not careful. Likewise, the 70° arc is better adapted to alignment with the trachea walls of most patients and therefore avoids distortion of the trachea.

When fully inserted, the distal end 52 of the inner cannula should fit flush with the distal end 46 of the outer cannula, as shown in FIG. 3, or may extend slightly beyond the distal end 46 of the outer cannula. Since the purpose of the inner cannula 26 is to allow removal of collected phlegm and mucous from the bore of the outer cannula 10, it is significant that the inner cannula 26 extend throughout the length of the outer cannula 10, but not extend substantially beyond the outer cannula 10. Any substantial extension beyond the outer cannula 10 would irritate the tracheal wall on insertion and removal of the inner cannula 26. If the inner cannula 26 does not extend at least the length of the outer cannula, obstructions at the distal end 46 of the outer cannula may not be removed with the inner cannula.

With continued reference to FIG. 3, the connector 28 is shown in its fully inserted position forming a seal between the abutting face 56 of the connector 28 and the face 58 of the inner cannula 26. This seal stops air from flowing between the inner cannula 26 and the outer cannula 10 and therefore restricts the passage of air into the trachea to that which passes through the central bore of the inner cannula 26. The upper end of the inner cannula 26 carries an annular shoulder 60 which fits rotatably within an annular recess 61 on the inner periphery of the tapered cylindrical connector 28. This permits the connector 28 to be rotated into the connector 18 without rotating the inner cannula 26.

Figure 4:
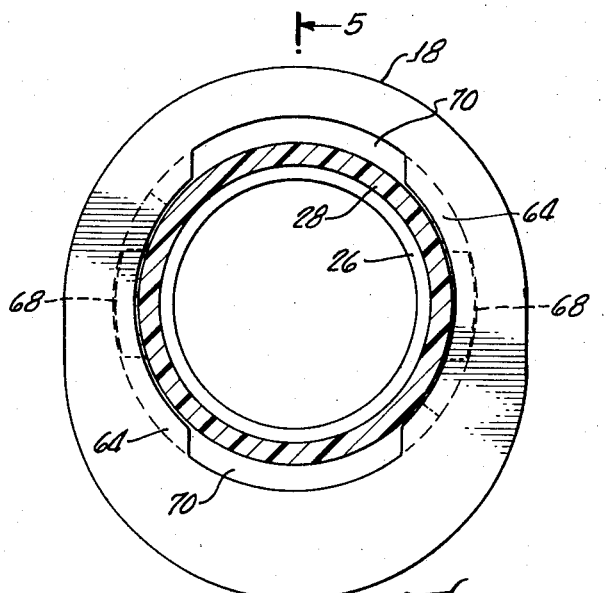
FIG. 4 is a sectional view taken substantially along lines 4—4 of FIG. 3 showing the sealing coupling between the inner and outer cannulas.
Figure 5:
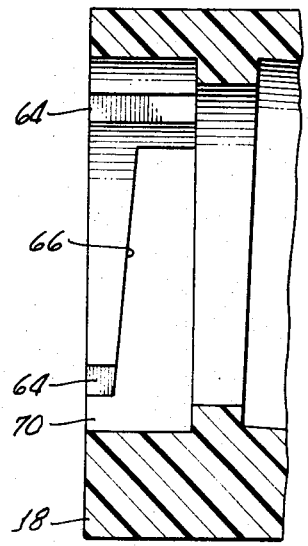
FIG. 5 is a sectional view taken substantially along lines 5—5 of FIG. 4 showing the sealing coupling portion of the outer cannulas.

FIGS. 4 and 5 more clearly illustrate the method of interconnection of the two connectors 18 and 28, showing how the connectors function to provide a pneumatic seal and to align the distal ends of the inner and outer cannulas. The connector 18 includes a pair of peripherally spaced, inwardly and circumferentially extending shoulders 64 having lower camming surfaces 66. The thickness of the shoulders 64 varies with their circumferential extension so that the lower camming surfaces 66 form a pair of circumferentially inclined planes. A pair of tabs 68 on the connector 28 are inserted through the space 70 between the circumferentially extending shoulders 64 and rotated beneath the surfaces 66. This rotation against the inclined surfaces 66 forces the connector 28 into sealing contact with the connectors 18 causing the surfaces 56 and 58, as shown in FIG. 3, to form a pneumatic seal. These abutting surfaces 56 and 58 also assure proper axial alignment of the inner cannula 26 within the outer cannula 10, so that the distal ends 52 and 46 of the inner and outer cannulas 26 and 10 will be substantially flush or the inner cannula will extend up to one thirty-second of an inch beyond the outer cannula.

The inner cannula 26, outer cannula 10, and sealing balloon 12 are preferably constructed of the same non-toxic polymer material. Such uniformity permits the formation of a continuous bond between the outer cannula 10 and the sealing balloon 12 which makes these elements materially integral and thus assures a pneumatic seal therebetween.

A material which is well adapted to construction of the present tracheotomy tubes is Poly Vinyl Chloride (PVC), such as Firestone's EXON No. 654 or Borden's VC-2605, made flexible with approximately 50 percent of a plasticizer, such as dioctyl phthalate, and colored with a small percentage of pigment such as titanium dioxide. The tubes may be formed by injection molding from compounds such as MacLin's VM 2800 and VM 0400. Any conventional inert plasticizer such as the adipate plasticizers or other phthalate esters can be used. A radio opaque material such as barium sulfate may be added to the compounds to permit x-ray observation of its position. The inflation balloon is formed with a higher quantity of plasticizer to provide greater flexibility.

The PVC may be treated to prevent degradation with age by addition of a small percentage of stabilizer material such as cadmium or zinc adipates or epoxy resins.

The cannulas are injection molded. The tubing 30 is then placed in the wall of the cannula in the passage 40. For example, the cannulas may be molded as axially extending half sections which are then thermally bonded. Each of the sections is molded to have half of the passage 40 in one of its axially extending edges so that the tube 30 can be fitted therein prior to bonding the two cannula halves together. The sealing balloon may be formed by dipping a form into molten PVC. A surface activator such as polyethylene glycol may be added in small percentages to avoid surface bubbles during this dipping process.

Dielectric heating of the polyvinyl chloride may be used to bind the sealing balloon to the outer cannula. The heating fuses the surfaces of these two members into one another, thus forming a uniform integral pneumatic sealing bond. This may be accomplished with a high frequency mandrel and annular ring generator. Additionally, a plastisol may be used as a bonding agent to fix the ends of the sealing balloon to the outer cannula. The plastisol may be heat cured to form an airtight bond. The bonding agent can be produced by dissolving a portion of the PVC cannula material into a volatile solvent.

Figure 6:
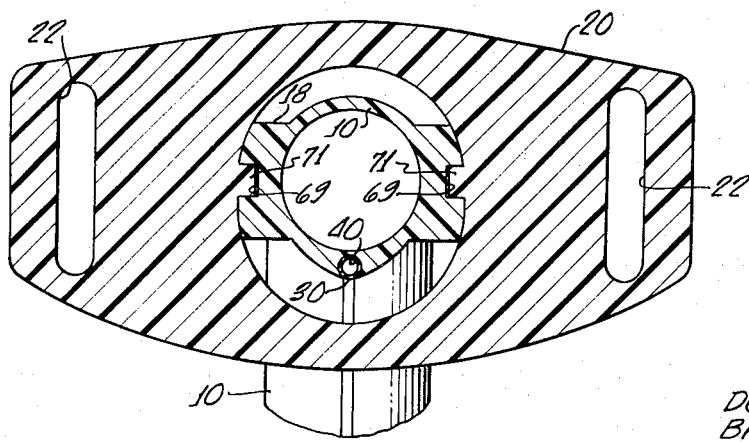
FIG. 6 is a vertical section taken substantially along the lines 6—6 of FIG. 3 showing the structure for the pivotally mounted neck flange.

FIG. 6 shows the method of pivotally mounting the swivel neck flange 20, which is also preferably constructed of semi-rigid polymer material, to the connector 18. The connector 18 contains two opposing cylindrical recesses 69 into which are fitted a pair of outwardly extending dowels 71 on the neck flange 20, these dowels 71 being free to rotate within the recesses 60. This allows the swivel neck flange 20 to rotate about the outer cannula 10 through a predetermined angle, this angle being limited by contact of the neck flange 20 with the connector 18 (see FIG. 3), and sufficient to allow a flush fit of the flange 20 with the neck of most patients, and yet not allowing complete freedom of movement of the outer cannula 10. The angular rotation of the flange 20 is limited to approximately 45° (15° upward and 30° downward) so that it will not pivot to interfere with insertion of the outer cannula 10 into the patient's neck, but will permit some freedom of movement of the patient's neck.

Figure 8:
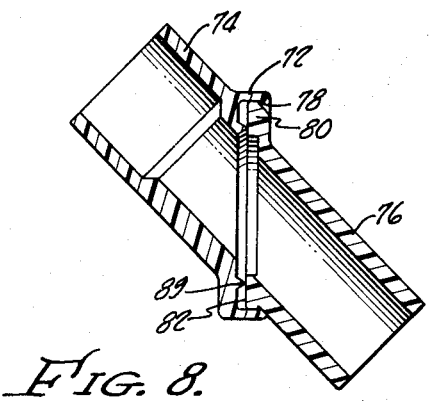
FIG. 8 is a vertical section through the swivel connector of FIG. 7 taken substantially along line 8—8 showing the outer tube swiveled to its extended position.
Figure 7:
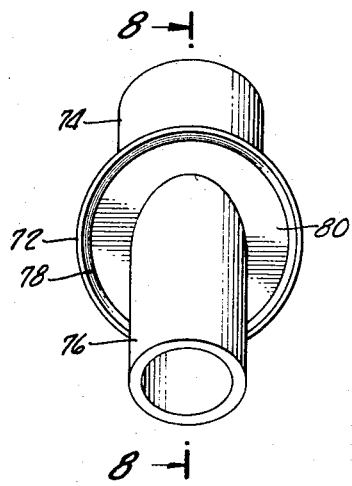
FIG. 7 is a perspective view of the swivel connector which is used to connect artificial respirator equipment to the inner cannula from variable positions.
Figure 9:
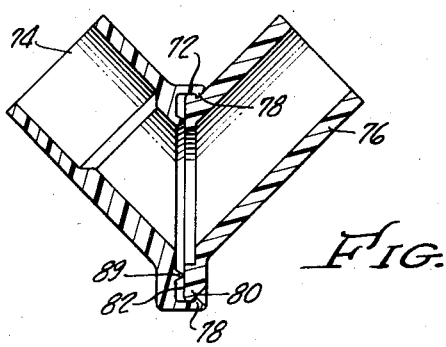
FIG. 9 is a sectional view as in FIG. 8, but with one of the connector members swiveled 180° from the position of FIG. 8 to form a right angle connection.

FIGS. 7, 8 and 9 describe the construction of a rotatable adapter 72 which may be attached to the connector 28. One end of the adapter 72 has a conical opening 74 which is designed to receive the frusto-conical fitting of connector 28 and form an airtight seal with that connector. The other end 76 of the adapter 72 is designed to be coupled with an artificial respiration device. Between these ends 74 and 76 there is a swivel connector which is offset at an angle of approximately 45° from both ends. This offset allows the tubular end 76 to be swiveled to a variety of angular locations relative to the end 74, therefore allowing the connections to the artificial respirating equipment to be made from different locations.

The swivel seal is formed by an annular lip 78 on the frustum end 74 which engages an annular tab 80 which projects from the tubular end 76. This inner connection of the lip 78 and the tab 80 allows the two pieces to swivel relative to one another while maintaining the inner surface 82 of the tab 80 in contact with a sealing ridge 84 on the frustum end 74.

The construction of the tube constricting pinch valve 36 for sealing the pressurized system which inflates the sealing balloon is best described with reference to FIG. 1. The valve 36 has a hollow cylindrical housing 86 which has the outer end 87 of the inflation tubing 34 cemented therein so that the inflation tube 34 extends axially throughout the inner bore of the housing 86. A transverse passage 88 is provided through the housing 86 intermediate one end of the housing and the point of attachment of the end 87 of the tube 34 to the inner housing bore. A cylindrically tapered clamping pin 89 is inserted into the transverse passage 88. The pin 89 has a pair of thumb operated pusher buttons 90 and 91 mounted on its opposite ends in conventional fashion for transversely moving the clamping pin 89. When the large diameter portion of the tapered pin 89 is pushed into the passage 88, the tube 34 is depressed against the internal bore of the housing 86 pinching the tubing shut. The end of the housing 86 which does not receive the tube 34 may be enlarged, as shown in FIG. 1, for receiving a hypodermis syringe to inflate the sealing balloon 12.

Use of this tracheotomy tube offers many advantages over prior art devices. The pivotal connection of the flange 20 allows the flange 20 to be fitted flush with the neck of patients with different anatomies while still allowing the outer cannula 10 to maintain the proper position for insertion in the trachea of the patient.

The flat outer surface of the sealing balloon 12 allows the tracheotomy tube to form a good pneumatic seal with the trachea with out applying a great amount of pressure to the trachea, as was required in prior art devices. Such pressure often caused necrosis of the inner tracheal tissue.

The connection of the adapter 72 to the inner cannula 26 through the connector 28 forces the user of this device to attach artificial respirator equipment only with the inner cannula in place. Since phlegm and mucous often form within the tracheal tubing, and therefore have a tendency to clog the central bore, one purpose of the inner cannula 26 is to allow cleaning of the central bore of the trachea tube without removal of the whole assembly from the patient. It is therefore advantageous to assure that the user of this device at all times maintains the inner cannula 26 in its proper position. It is also important that the end 52 of the inner cannula and the end 46 of the outer cannula remain flush with one another, as is assured by the sealed connection between the connectors 18 and 28, so that when the inner cannula is removed the total bore of the tracheotomy tube may be cleaned.

The rotatable connector 76 allows connection of the tracheotomy tube to respiration support equipment from a variety of angles to minimize discomfort to the patient and disruption of the working areas around him.

The valve 36 allows quick setting and releasing of pressure within the sealing balloon 12 to facilitate proper inflation and maintaining of the pressure within the sealing balloon 12.

We claim:

1. A tracheotomy tube for insertion through an incision in the patient's neck into the trachea to support breathing, comprising:
   an outer cannula having a first end for placement within said trachea and a second end for placement outside said trachea, said outer cannula curved through an arc between said first and second ends;
   an inner cannula inserted into the bore of said outer cannula, said inner cannula being removable from said outer cannula so as to permit removal of obstructions from the tracheotomy tube; and
   an elongated inflatable cuff surrounding said first end of the outer cannula and permanently affixed thereto, said cuff when inflated in the trachea being adapted to engage the inner wall of the trachea to form a seal between the tube and the trachea, said cuff including means to cause it to inherently form a substantially cylindrical configuration when inflated and unrestrained, with the result that the sealing force against the trachea is substantially uniform along the cylindrical cuff length, so that a low pressure seal is provided which avoids localized pressure on the trachea and prevents necrosis of the trachea tissue.

2. A tracheotomy tube as defined in claim 1 including a cuff inflation line carried by said outer cannula extending substantially flush thereagainst for an extent from a point communicating within said interior of said cuff to a point adjacent said second end of said cannula outside of said trachea.

3. A tracheotomy tube as defined in claim 1 wherein said tube further includes a neck flange mounted at said second end of said outer cannula for positioning outside said trachea, said neck flange being mounted for free pivotal motion between first and second angular positions relative to said outer cannula to permit a slight movement of said outer cannula when inserted into said trachea.

4. A tracheotomy tube for insertion through a patient's neck into the trachea to support breathing comprising:
   a cannula having a first end for placement within said trachea and a second end for placement outside said trachea; and
   a flange pivotally connected to said second end so that said flange is freely rotatably adjustable between first and second angular positions relative said cannula about said pivot to fit flush against various neck anatomies, said flange providing free pivotable support of said cannula when said cannula is located within said trachea.

5. A tracheotomy tube for insertion into the trachea comprising:
- an outer cannula, having a first end and a second end, said outer cannula comprising a cylindrical tubing having an arc of approximately 70° between its ends;
- a first connector attached to said second end of said outer cannula;
- an inner cannula adapted to fit within said outer cannula and having a first end and a second end, said inner cannula comprising a cylindrical tubing of smaller diameter than said outer cannula and having an arc of approximately 70° between its ends;
- a second connector rotatably mounted on said second end of said inner cannula;
- means on said first and second connectors for maintaining said connectors together;
- sealing means permanently affixed to said outer cannula adjacent said first end thereof for sealing said outer cannula within said trachea, having a radius larger than that of the outside of said outer cannula and having two ends, each of which project outwardly from the surface of said outer cannula, said two ends separated by a finite length along the axis of said outer cannula; and
- a swivel neck flange mounted on said first connector so that said flange is freely rotatably adjustable between first and second angular positions relative said outer cannula to fit flush against various neck anatomies, said flange including means for receiving a strap for securing said tracheotomy tube to the neck of a patient, said flange pivotally supporting said outer cannula when said outer cannula is within said trachea.

* * * * *